(12) United States Patent
Jeon

(10) Patent No.: US 8,953,835 B2
(45) Date of Patent: Feb. 10, 2015

(54) MOBILE TERMINAL AND METHOD FOR FORMING HUMAN NETWORK USING THE SAME

(75) Inventor: Hyeong-Baek Jeon, Gwangju-si (KR)

(73) Assignee: Pantech Co., Ltd., Seoul (KR)

( * ) Notice: Subject to any disclaimer, the term of this patent is extended or adjusted under 35 U.S.C. 154(b) by 668 days.

(21) Appl. No.: 12/868,497

(22) Filed: Aug. 25, 2010

(65) Prior Publication Data

US 2011/0182484 A1 Jul. 28, 2011

(30) Foreign Application Priority Data

Jan. 28, 2010 (KR) .......................... 10-2010-0008106

(51) Int. Cl.
*G06K 9/00* (2006.01)
*G06Q 10/10* (2012.01)

(52) U.S. Cl.
CPC ............ *G06K 9/00295* (2013.01); *G06Q 10/10* (2013.01)
USPC ............................. 382/100; 715/835; 709/204

(58) Field of Classification Search
CPC ...................................................... G06Q 50/01
USPC ............................ 382/103, 115, 100; 709/204
See application file for complete search history.

(56) References Cited

U.S. PATENT DOCUMENTS

| | | | |
|---|---|---|---|
| 6,038,333 A | 3/2000 | Wang | |
| 7,508,419 B2 | 3/2009 | Toyama et al. | |
| 7,945,653 B2 * | 5/2011 | Zuckerberg et al. | 709/223 |
| 8,041,738 B2 * | 10/2011 | Flaks et al. | 707/790 |
| 8,078,677 B2 * | 12/2011 | Mendiola | 709/204 |
| 8,095,551 B2 * | 1/2012 | Kountz et al. | 707/758 |
| 2002/0054059 A1 * | 5/2002 | Schneiderman | 345/700 |
| 2003/0167324 A1 * | 9/2003 | Farnham et al. | 709/224 |
| 2004/0119760 A1 * | 6/2004 | Grossman et al. | 345/854 |
| 2004/0181592 A1 * | 9/2004 | Samra et al. | 709/220 |
| 2005/0091272 A1 * | 4/2005 | Smith et al. | 707/104.1 |
| 2006/0107297 A1 * | 5/2006 | Toyama et al. | 725/105 |
| 2007/0078832 A1 * | 4/2007 | Ott et al. | 707/3 |
| 2007/0118508 A1 * | 5/2007 | Svendsen | 707/3 |
| 2008/0091723 A1 * | 4/2008 | Zuckerberg et al. | 707/104.1 |
| 2008/0189336 A1 * | 8/2008 | Prihodko | 707/104.1 |
| 2008/0288596 A1 * | 11/2008 | Smith et al. | 709/206 |
| 2008/0295031 A1 * | 11/2008 | Miyazaki | 715/835 |

(Continued)

FOREIGN PATENT DOCUMENTS

| | | |
|---|---|---|
| CN | 101635005 | 1/2010 |
| EP | 0944019 | 9/1999 |

(Continued)

OTHER PUBLICATIONS

Social Network Service Using Google's Picasa! Application of Picasa Face Tags.

(Continued)

*Primary Examiner* — Hadi Akhavannik
(74) *Attorney, Agent, or Firm* — H.C. Park & Associates, PLC

(57) ABSTRACT

A mobile terminal and a method of forming a human network using the same are provided. The method for forming a human network includes selecting a person of interest from an image; selecting a relay person from the first stored image to which information about the selected person of interest is relayed through facial recognition; and acquiring the personal information for the selected person of interest from a mobile terminal of the selected relay person.

23 Claims, 18 Drawing Sheets

(56) References Cited

U.S. PATENT DOCUMENTS

| | | | |
|---|---|---|---|
| 2009/0024741 A1* | 1/2009 | Roach | 709/225 |
| 2009/0119608 A1* | 5/2009 | Huskey | 715/764 |
| 2009/0241039 A1 | 9/2009 | Estevez et al. | |
| 2012/0041907 A1* | 2/2012 | Wang et al. | 706/12 |

FOREIGN PATENT DOCUMENTS

| | | |
|---|---|---|
| JP | 2006-040014 | 2/2006 |
| JP | 2009-135616 | 6/2009 |
| KR | 1020050067396 | 7/2005 |
| KR | 1020080113843 | 12/2008 |
| KR | 1020090013037 | 2/2009 |
| KR | 10-2009-0073294 | 7/2009 |
| KR | 1020090112899 | 10/2009 |
| WO | 2009/116049 | 9/2009 |

OTHER PUBLICATIONS

Stone et al., "Autotagging Facebook: Social Network Context Improves Photo Annotation," Computer Vision and Pattern Recognition Workshops. Jun. 23, 2008, pp. 1-8, IEEE, Piscataway, NJ, USA.

Extended European Search Report issued on Feb. 20, 2014 for European Patent Application No. 10171678.

* cited by examiner

MOBILE TERMINAL AND METHOD FOR FORMING HUMAN NETWORK USING THE SAME

CROSS REFERENCE TO RELATED APPLICATION

This application claims the benefit from and the benefit of Korean Patent Application No. 10-2010-0008106, filed on Jan. 28, 2010, which is hereby incorporated by reference for all purposes.

BACKGROUND

1. Field

The following description relates to a social network service, and more particularly, to a mobile terminal and a method for forming a human network using the mobile terminal.

2. Discussion of the Background

With the development of modern technology, mobile terminals, such as cellular phones, have acquired various functions. Accordingly, users may use the various functions, such as a camera, wireless Internet, mobile multimedia broadcasting services, as well as, a communication function, through the mobile terminals. In particular, social exchange services have rapidly developed while the mobile terminals have become associated through Internet communities with messengers, blogs, mobile web, and the like.

SUMMARY

Exemplary embodiments of the present invention provide a method and mobile terminal capable of forming a human network using a mobile terminal.

Additional features of the invention will be set forth in the description which follows, and in part will be apparent from the description, or may be learned by practice of the invention.

An exemplary embodiment of the present invention discloses a method for forming a human network using a mobile terminal, the method including selecting a person of interest from a first image of stored images; selecting a relay person from the first image to which information about the selected person of interest is relayed; and acquiring the personal information for the selected person of interest from a mobile terminal of the selected relay person.

An exemplary embodiment of the present invention discloses a mobile terminal including an image storage to store images; a personal information storage to store personal information for persons included in the stored images; an operating unit to select a person of interest from the stored images; a controller to select a relay person from a first image to which information about the selected person of interest is relayed of the stored images; and a personal information acquirer to acquire the personal information for the selected person of interest from a mobile terminal of the selected relay person An exemplary embodiment of the present invention discloses a method for forming a human network using a mobile terminal, the method selecting a person of interest from a first image; identifying personal information for the selected person of interest using facial recognition; and retrieving the personal information for the selected person of interest.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
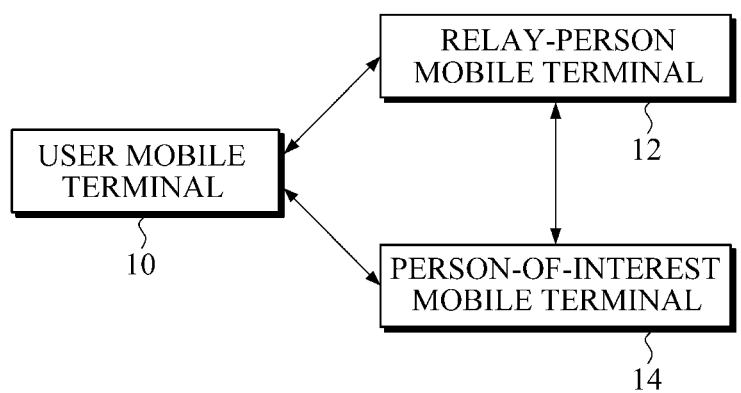
FIG. 1 is a block diagram illustrating mobile terminals of a human network according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram illustrating mobile terminals of a human network according to an exemplary embodiment of the present invention. Referring to FIG. 1, mobile terminals include a user mobile terminal 10, a relay-person mobile terminal 12, and a person-of-interest mobile terminal 14. Although three mobile terminals are shown in FIG. 1, aspects are not limited thereto such that the human network may include fewer mobile terminals, such as 2, or more mobile terminals, such as four or more.

Images are stored in the user mobile terminal 10 owned by a user. In this case, the images may be in the form of photographic data or image data, indicating still images or moving images, for example, data of photographs or images including persons. Personal information for persons included in the images or for acquaintances of the user is also stored in the user mobile terminal 10.

In this case, the personal information includes any information of a person's history. For example, the personal information may be name, face, birthday, address, schedule, memo, task, and alarm information. The personal information may further include communication information of a person. For example, the personal information may include contact information for call service, short message service (SMS) or multimedia messaging service (MMS), an E-mail address for E-mail service, a blog address for social network service (SNS), and records related to web-based communications including chatting, visitors' books, and comments. The personal information may further include log information, which is generated as the user communicates with a person through the user mobile terminal 10, such as voice communication transmission and reception records and short message transmission and reception records.

Meanwhile, the user may desire to know personal information for any person included in the images displayed by or stored in the user mobile terminal 10 or to form a human network with the person. Hereinafter, the person is referred to as a person of interest. However, personal information of the person of interest may not be stored in the user mobile terminal 10. In this case, the user mobile terminal 10 uses a relay person related to the person of interest in order to acquire the personal information for the person of interest. The relay person is may know the personal information for the person of interest, and may have personal information stored in the relay-person mobile terminal 12, i.e., a mobile terminal associated with or corresponding to the relay person.

The user mobile terminal 10 acquires the personal information for the person of interest from the person-of-interest mobile terminal 14 associated with or corresponding to the person of interest through the relay-person mobile terminal 12. The user mobile terminal 10 communicates with the person-of-interest mobile terminal 14 through the acquired personal information. Accordingly, the user may form the human network with the person of interest.

A method for forming a human network using the user mobile terminal 10 will be described in detail with reference to the accompanying drawings. In this case, terms related to the user mobile terminal 10 of FIG. 1 are used together with terms related to a mobile terminal to explain the method for forming a human network from the perspective of the user.

Figure 2:
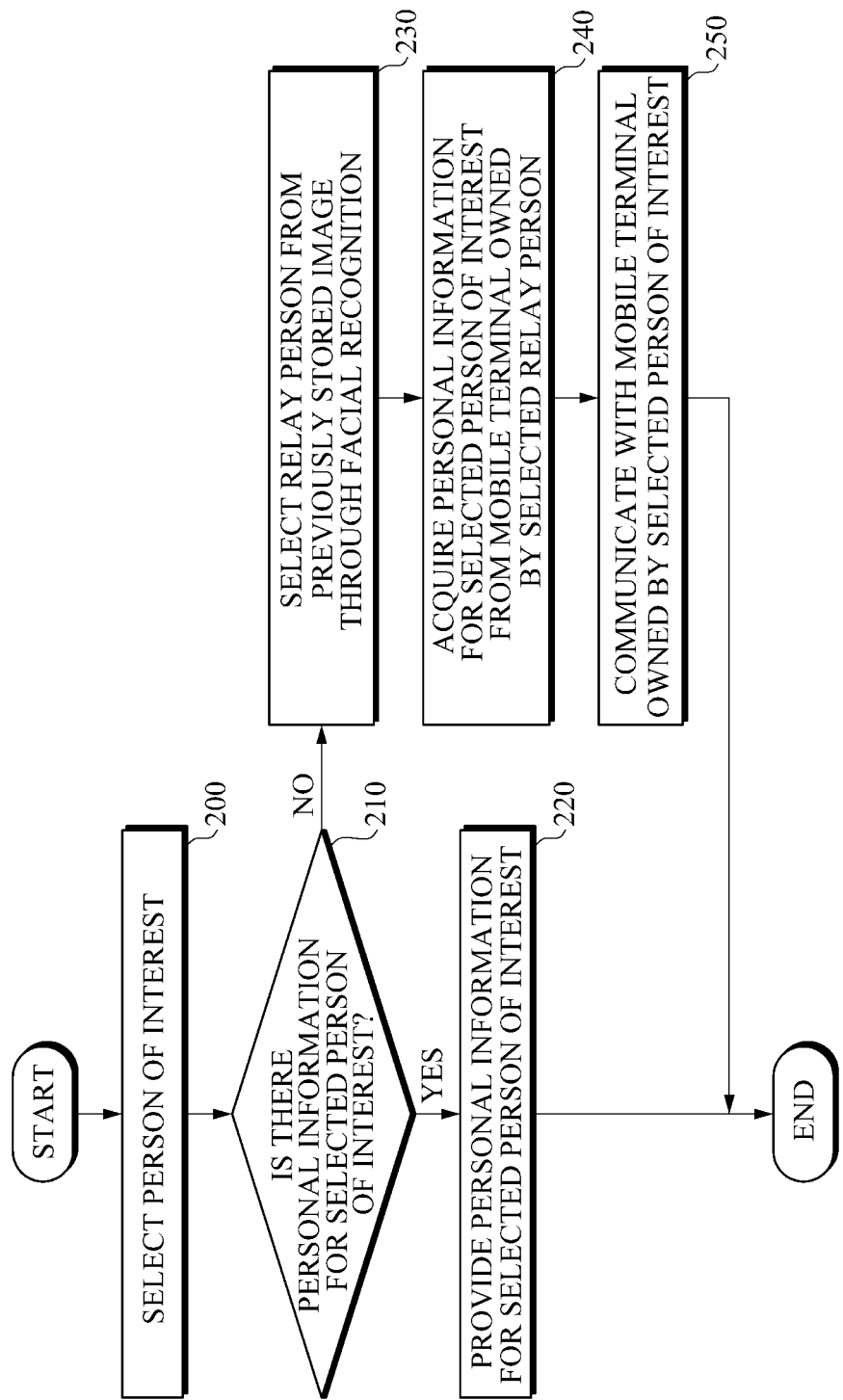
FIG. 2 is a flowchart illustrating a method for forming a human network using a mobile terminal according to an exemplary embodiment of the present invention.

FIG. 2 is a flowchart illustrating a method for forming a human network using the user mobile terminal 10 according to an exemplary embodiment of the present invention. Referring to FIG. 2, a person of interest to the user mobile terminal 10 user is selected from the stored image and input to the user mobile terminal 10 in operation 200. In operation 200, the user mobile terminal 10 detects facial areas of persons included in the stored image. If the person of interest is selected, the user mobile terminal 10 recognizes a facial area of the selected person of interest from the detected facial areas and selects a person having the recognized facial area as the person of interest.

The selection of the person of interest may be performed through a pointing input unit. The pointing input unit is in a key input form including directional keys such as left, right, up, and down keys and a confirmation key, or in the form of a joystick, a mouse, a pointing stick, a figure input plate (tablet), a trackball, a write pen, or a figure processing plate (graphics tablet). Alternatively, the pointing input unit may be in a touch pad form capable of sensing a touch signal through a touch sensor, such as a touch screen.

Then, the user mobile terminal 10 determines whether personal information for the selected person of interest is available in operation 210. The user mobile terminal 10 recognizes the selected person of interest through facial recognition. The user mobile terminal 10 retrieves personal information for a person having a facial area matching a facial area of the recognized person of interest using face pattern matching.

Any conventional algorithms may be used for the facial recognition and face pattern matching. For example, the face area may be recognized by detecting edge information (contour) from a luminance signal distribution on an image and performing a comparison with a configurational model to detect components, such as facial contour, eyes, nose, and mouth, but the exemplary embodiments of the present invention are not limited thereto.

Meanwhile, if the personal information for the selected person of interest is available in the user mobile terminal 10, the user mobile terminal 10 provides the personal information in operation 220. In this case, the personal information may be provided by displaying the personal information on a screen of the user mobile terminal 10. On the other hand, if the personal information for the selected person of interest is not available, the user mobile terminal 10 selects a relay person from the stored image to which the selected person of interest is relayed through facial recognition in operation 230. A method for selecting the relay person in the user mobile terminal 10 according to various exemplary embodiments will now be described.

The user mobile terminal 10 may select an unselected person in an image including the selected person of interest as a relay person.

The user mobile terminal 10 may retrieve another image including the unselected person to select the relay person. For example, the user mobile terminal 10 selects a person other than the unselected person in the retrieved other image as the relay person or selects the person other than the unselected person as a new relay person. The retrieval of the other image may be performed if personal information for the person selected as the relay person in the image including the selected person of interest is not retrieved or available.

The user mobile terminal 10 may select the relay person using photograph information indicating an image photographing place or an image photographing time. For example, the user mobile terminal 10 retrieves an image having photograph information similar to photograph information for the image including the person of interest from the previously stored images. The user mobile terminal 10 selects a person included in the retrieved image as the relay person. Alternatively, the user mobile terminal 10 selects a person included in an image having photograph information similar to photograph information for an image including the selected relay person as a new relay person.

The user mobile terminal 10 may use group information of members grouped through a social network in the personal information. For example, the user mobile terminal 10 selects a person included in the same group as the person of interest in the previously stored image as the relay person. Alternatively, the user mobile terminal 10 selects a person included in the same group as the selected relay person as a new relay person.

The user mobile terminal 10 may use schedule information in the personal information. For example, the user mobile terminal 10 retrieves a person having schedule information corresponding to the photograph information for the image including the person of interest from the previously stored image. The user mobile terminal 10 selects the retrieved person as the relay person. Meanwhile, the user mobile terminal 10 may use a geo tag may be used to select the relay person.

The user mobile terminal 10 may select the relay person according to at least one priority, including a friendliness level with the person of interest, a physical distance from the person of interest, and a contactability level with the person of interest. For example, the user mobile terminal 10 may select the relay person in order of a higher friendliness level, a shorter physical distance, and/or a higher contactability level.

Referring back to FIG. 2, the user mobile terminal 10 acquires the personal information for the person of interest from the relay-person mobile terminal 12 owned by the relay person selected in operation 240. The user mobile terminal 10 may communicate with the person-of-interest mobile terminal 14 using the acquired personal information for the person of interest in operation 250. The user mobile terminal 10 may request the relay-person mobile terminal 12 to provide the personal information for the person of interest using communication information of the selected relay person, and may receive the personal information. The user mobile terminal 10 communicates with the person-of-interest mobile terminal 14 using the received personal information for the person of interest. For example, the user mobile terminal 10 may use at least one of a call service, a short message service (SMS), a multimedia messaging service (MMS), an E-mail, and a social network service (SNS). Accordingly, the user mobile terminal 10 user may communicate with a person of interest included in the stored image but not known and form the human network.

Further, in operation 240 and operation 250, the user mobile terminal 10 may request the person-of-interest mobile terminal 14 to accept communication with the user mobile terminal 10 through relay of the relay-person mobile terminal 12. Here, if the person of interest and the user requesting the personal information for the person of interest are included in the same group on the relay-person mobile terminal 12, the operation of requesting the person-of-interest mobile terminal 14 to accept the communication with the user mobile terminal 10 may be omitted.

Figure 3A:
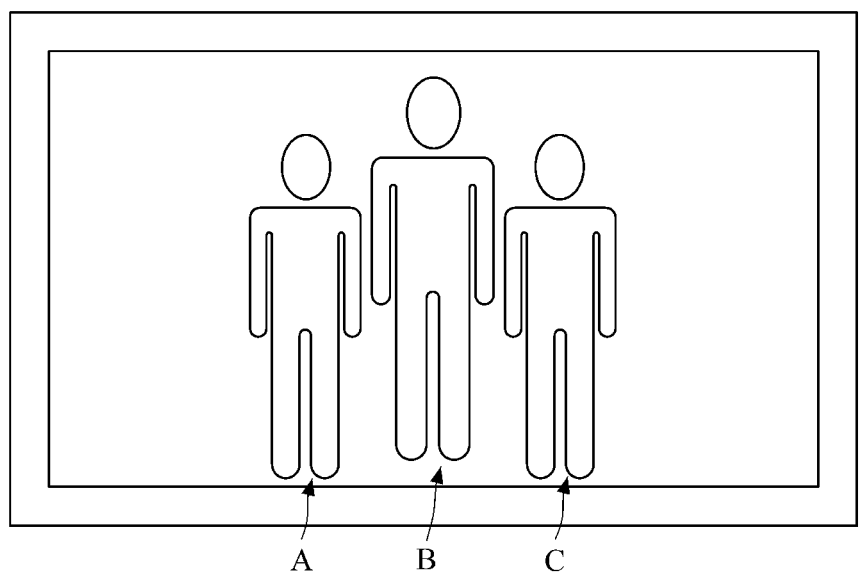
FIG. 3a, FIG. 3b, and FIG. 3c are reference diagrams illustrating a screen of a mobile terminal for explaining a person of interest and a relay person according to an exemplary embodiment of the present invention.
Figure 3B:
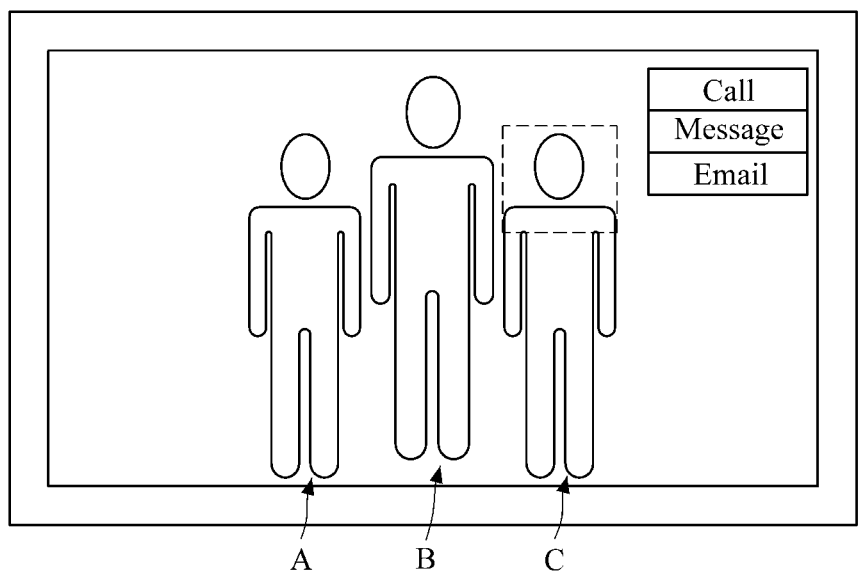
Figure 3C:
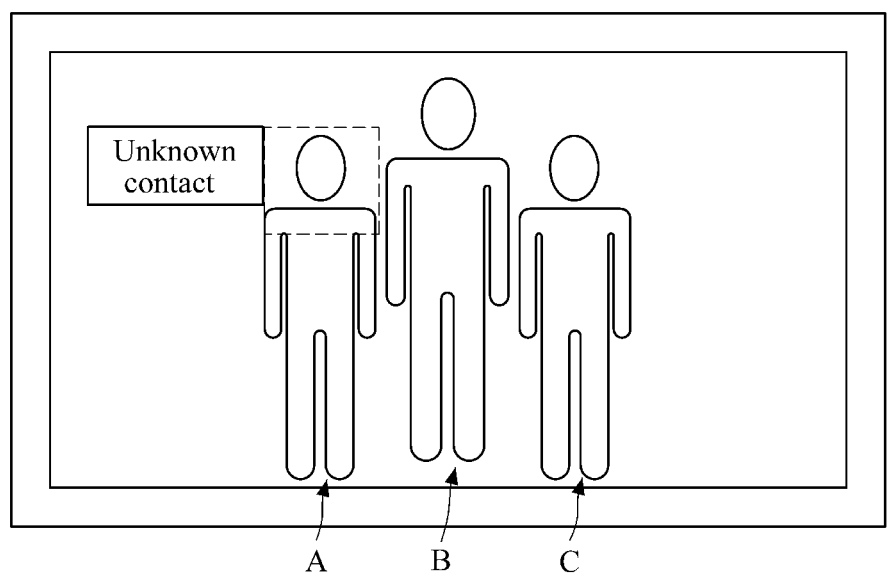

FIG. 3a, FIG. 3b, and FIG. 3c are reference diagrams illustrating a screen of the user mobile terminal 10 for explaining a person of interest and a relay person according to an exemplary embodiment of the present invention.

Referring to FIG. 3a, FIG. 3b, and FIG. 3c, a person of interest A who is an object of interest to the user is selected from an image shown in FIG. 3a. In this case, personal information of the selected person of interest A is retrieved or requested. If the personal information of the selected person of interest A is not retrieved or not available, the user mobile terminal 10 selects relay persons B and/or C to which the person of interest A is relayed through facial recognition, as shown in FIG. 3b. The relay persons B and C may be related to person of interest A, may know person of interest A, and may have personal information that has been stored in the relay-person mobile terminal 12. In this case, the user mobile terminal 10 may access or retrieve personal information of the person of interest A through communication with relay persons B and C, and communicate with the person of interest A using the personal information of the person of interest A.

FIG. 4a, FIG. 4b, FIG. 4c, and FIG. 4d are reference diagrams illustrating a screen of the user mobile terminal 10 for explaining a process of selecting a relay person from an image including a person of interest according to an exemplary embodiment of the present invention.

Figure 4A:
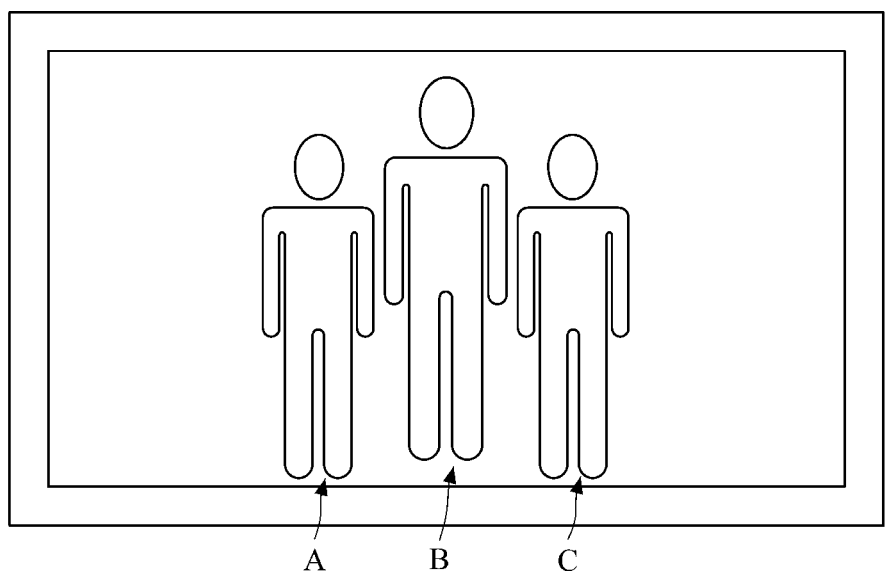
FIG. 4a, FIG. 4b, FIG. 4c, and FIG. 4d are reference diagrams illustrating a screen of the mobile terminal for explaining a process of selecting a relay person from an image including a person of interest according to an exemplary embodiment of the present invention.
Figure 4B:
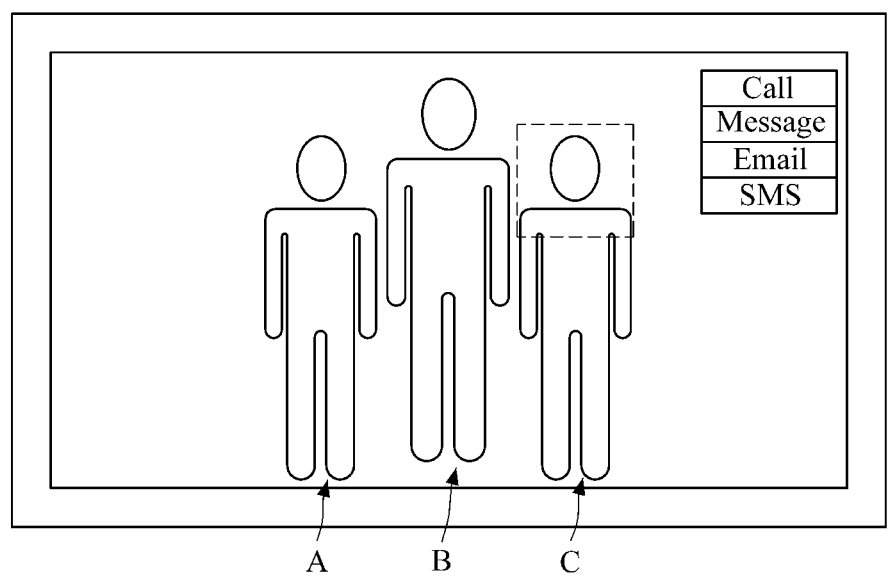
Figure 4C:
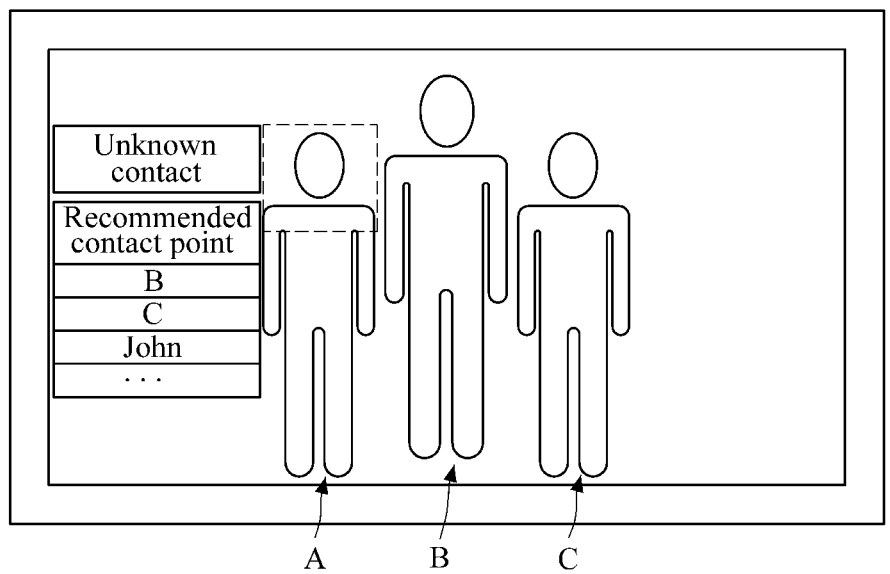

Referring to FIG. 4a, FIG. 4b, FIG. 4c, and FIG. 4d, a person of interest A who is an object of interest to the user is selected from an image shown in FIG. 4a. In this case, personal information for the selected person of interest A is retrieved or requested. When the personal information of the selected person of interest A is not retrieved or available, the user mobile terminal 10 selects relay persons B and/or C to which the person of interest A is relayed through facial recognition, as shown in FIG. 4b. The relay persons B and C are included in an image containing person of interest A and may know person of interest A. In this case, communication information of the relay persons B and C may be displayed on the screen, as shown in FIG. 4b. Meanwhile, the user mobile terminal 10 may display information regarding the relay persons B and C around person of interest A, such as a recommended contact, as shown in FIG. 4c.

Figure 4D:
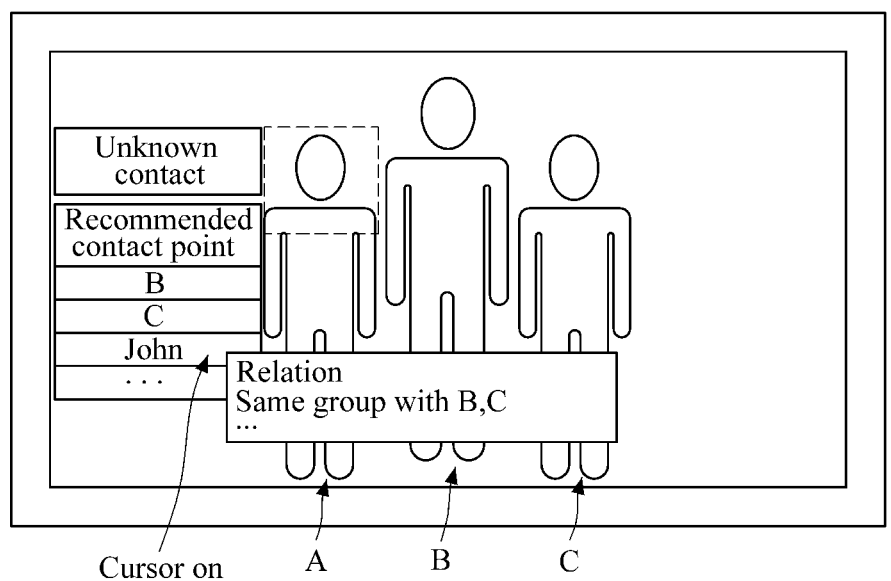

Further, the user mobile terminal 10 may use group information to select the relay person. The group information is obtained by grouping members through a social network of the user mobile terminal 10 user. For example, the user mobile terminal 10 may select John included in the same group as the relay persons B and C as the relay person, as shown in FIG. 4d.

Figure 5:
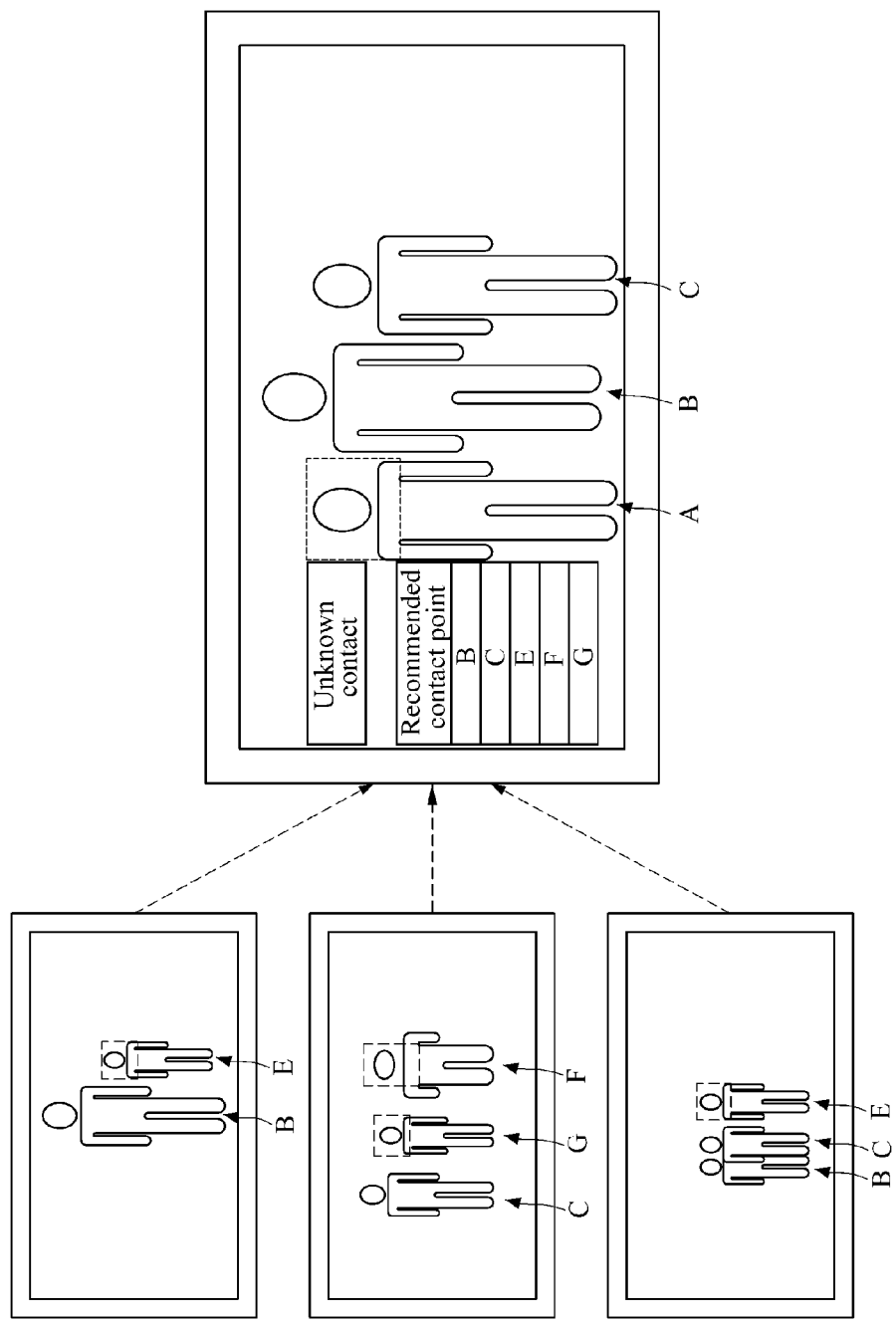
FIG. 5 is a reference diagram illustrating a screen of a mobile terminal for explaining a process of selecting a relay person from another image including an unselected person according to an exemplary embodiment of the present invention.

FIG. 5 is a reference diagram illustrating a screen of the user mobile terminal 10 for explaining a process of selecting a relay person from another image including an unselected person according to an exemplary embodiment of the present invention.

Referring to FIG. 5, when the selected relay persons are B and C, the user mobile terminal 10 retrieves another image including relay persons B and C through facial recognition.

For example, the user mobile terminal 10 retrieves an image including persons B and E, an image including persons C, G, and F, and an image including persons B, C, and E. In this case, the user mobile terminal 10 selects persons E, F, and G as the relay persons, as well as the relay persons B and C because the relay persons E, F, and G related to relay persons B and C may know person of interest A. In this case, the user mobile terminal 10 may display relay persons B, C, E, F, and G around person of interest A, as shown in FIG. 5.

Figure 6A:
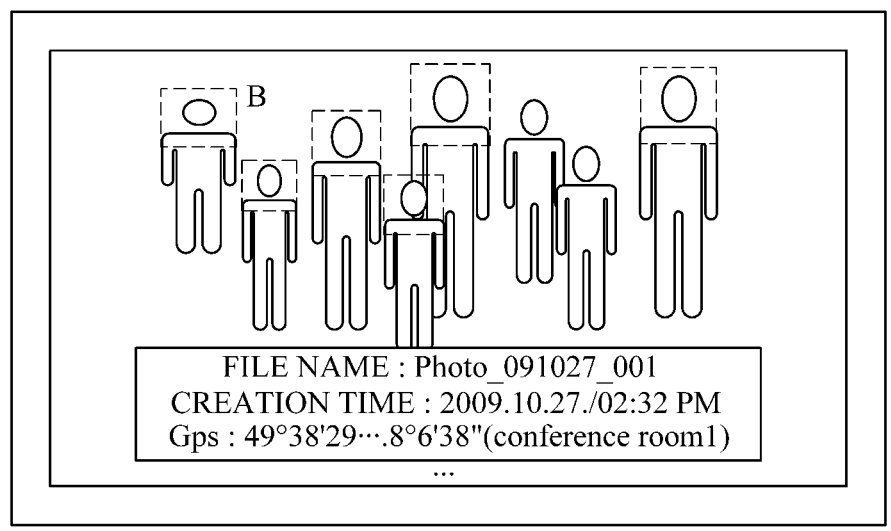
FIG. 6a and FIG. 6b are reference diagrams illustrating a screen of a mobile terminal for explaining a process of selecting a relay person using photograph information according to an exemplary embodiment of the present invention.
Figure 6B:
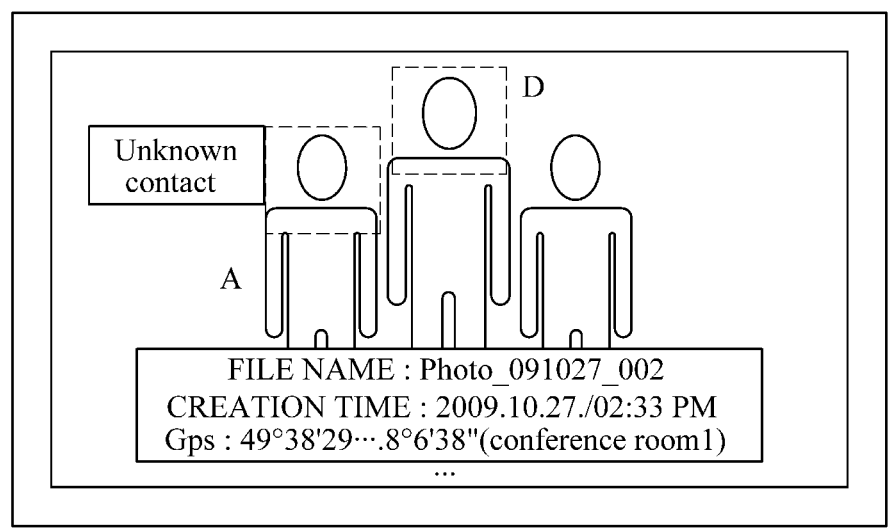

FIG. 6a and FIG. 6b are reference diagrams illustrating a screen of the user mobile terminal 10 for explaining a process of selecting a relay person using photograph information according to an exemplary embodiment of the present invention.

Referring to FIG. 6a and FIG. 6b, the user mobile terminal 10 according to an exemplary embodiment of the present invention retrieves another image photographed at a similar time and a similar place to an image including the person of interest or the relay person using photograph information of the images. The photograph information indicates a photographing place, a photographing purpose, or time of the image. The user mobile terminal 10 selects a person included in the retrieved image as the relay person through facial recognition.

For example, the user mobile terminal 10 determines from the photograph information that a photographing purpose is a conference or workshop (for example, indicating that the photographing place is conference room 1 through GPS) for an image including relay person B, as shown in an image of FIG. 6a. In this case, the user mobile terminal 10 retrieves an image having similar photograph information. For example, the user mobile terminal 10 may retrieve an image based on GPS information corresponding to conference room 1 and/or the photographing purpose, which is a conference or workshop, using the photograph information for other images.

In this case, when the image shown in FIG. 6b is retrieved, the user mobile terminal 10 may select person D included in the image shown in FIG. 6b as a new relay person. The selected relay person D may know person of interest A.

FIG. 7a, FIG. 7b, FIG. 7c, and FIG. 7d are reference diagrams illustrating a screen of the user mobile terminal 10 for explaining a process of selecting a relay person using a geo tag according to an exemplary embodiment of the present invention.

Figure 7A:
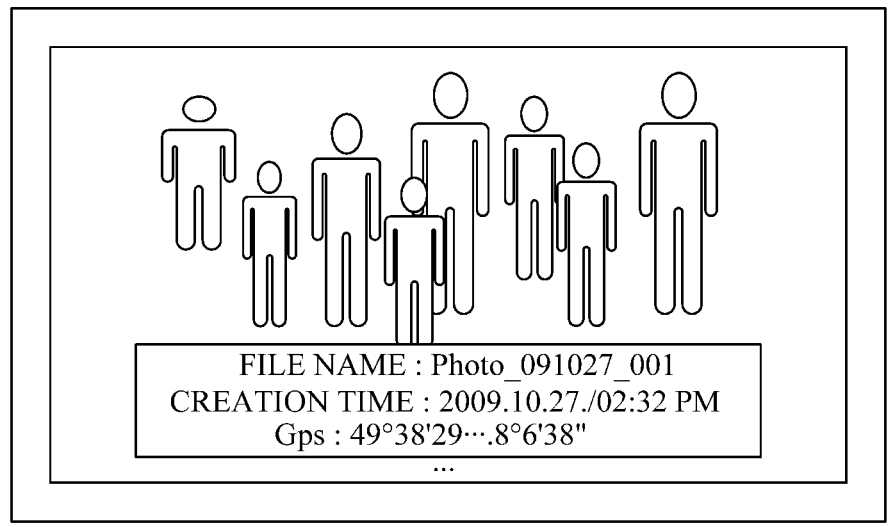
FIG. 7a, FIG. 7b, FIG. 7c, and FIG. 7d are reference diagrams illustrating a screen of a mobile terminal for explaining a process of selecting a relay person using a geo tag according to an exemplary embodiment of the present invention.
Figure 7B:
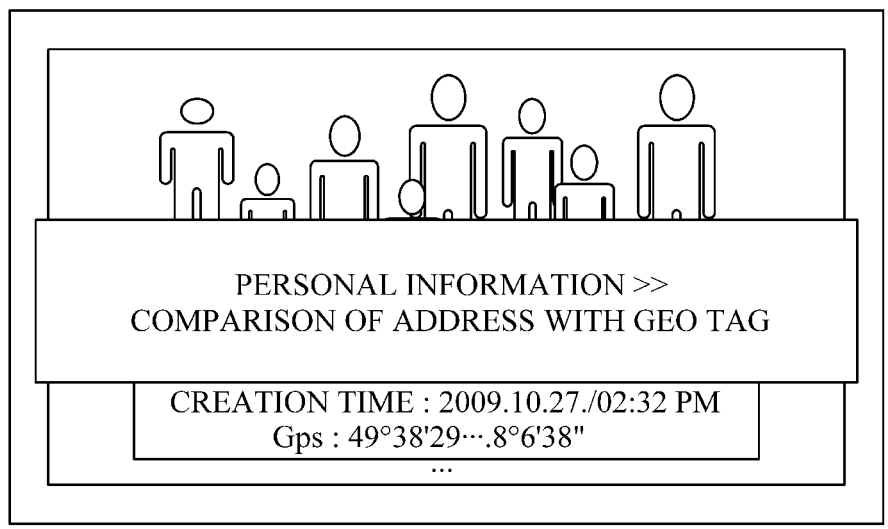
Figure 7C:
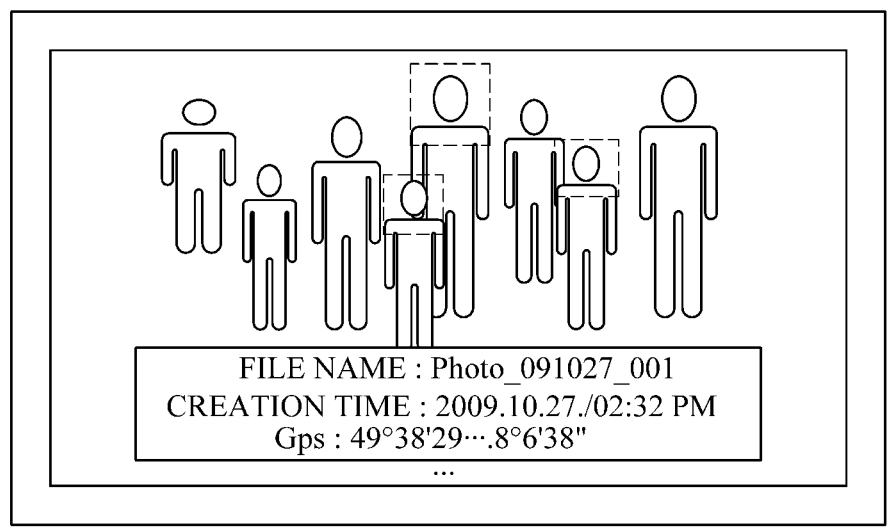
Figure 7D:
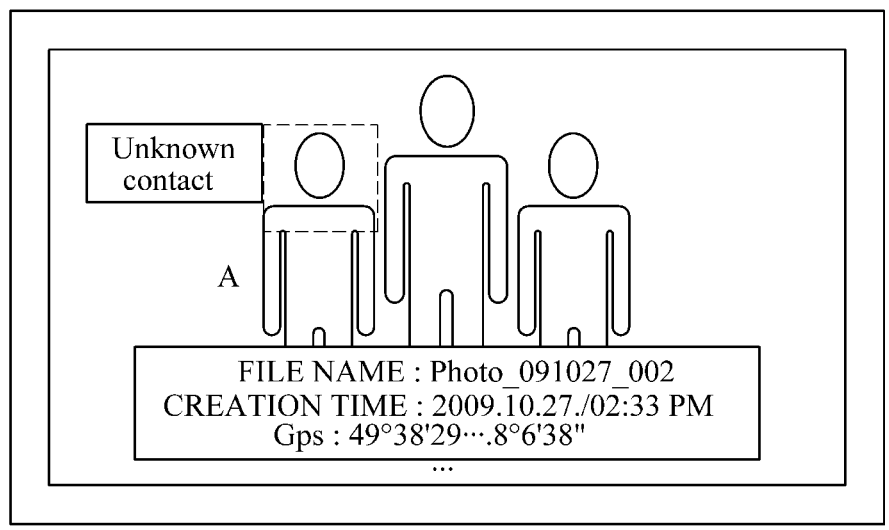

Referring to FIG. 7a, FIG. 7b, FIG. 7c, and FIG. 7d, the user mobile terminal 10 selects a person as a relay person residing in the same region as the user, the person of interest, or the relay person using a geo tag. The geo tag indicates information on a position at which each image is photographed using a GPS function of the user mobile terminal 10. For example, as shown in FIG. 7b, the user mobile terminal 10 compares an address included in personal information with the geo tag through retrieval of personal information. If a person residing in the same region is retrieved, the user mobile terminal 10 recognizes a face of the retrieved person from an image shown in FIG. 7a, as shown in FIG. 7c. Subsequently, the user mobile terminal 10 selects the person having the recognized face as a relay person. The selected relay person may know person of interest A, as shown in FIG. 7d. Further, personal information of persons in images may be compared to retrieve a person of interest in a same region as a person in an image including the person of interest.

Figure 8:
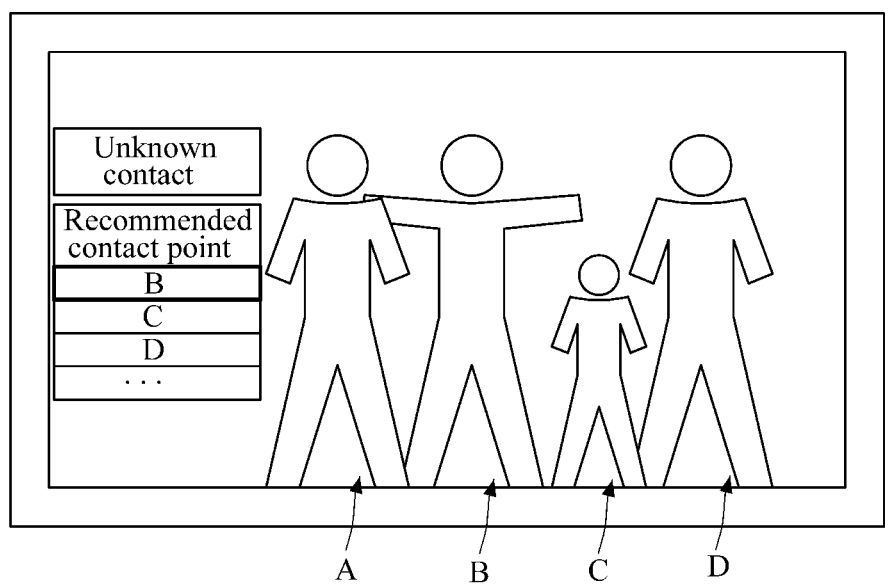
FIG. 8 is a reference diagram illustrating a screen of a mobile terminal for explaining a process of selecting a relay person based on a priority according to an exemplary embodiment of the present invention.

FIG. 8 is a reference diagram illustrating a screen of the user mobile terminal 10 for explaining a process of selecting a relay person based on a priority according to an exemplary embodiment of the present invention. Referring to FIG. 8, the user mobile terminal 10 selects a relay person according to at least one priority, including a friendliness level with the person of interest, a physical distance from the person of interest, and a contactability level with the person of interest. For example, the user mobile terminal 10 may select person B who exhibits an activity indicating friendliness with person of interest A (e.g., holding hands or putting arms around each other's shoulders), as the relay person, as shown in FIG. 8.

Figure 9:
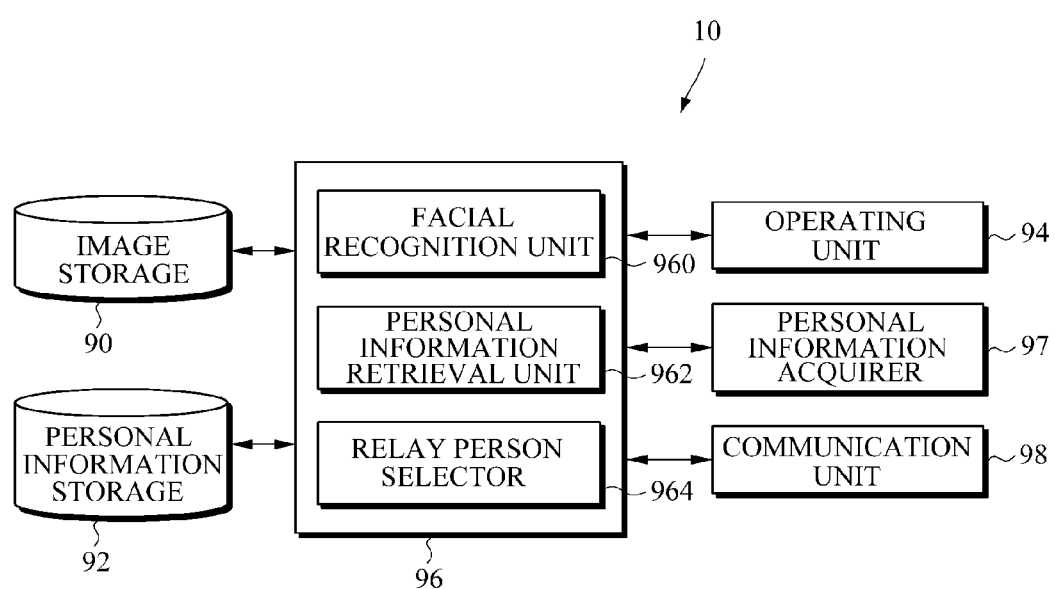
FIG. 9 is a block diagram of a mobile terminal according to an exemplary embodiment of the present invention.

FIG. 9 is a block diagram of the user mobile terminal 10 according to an exemplary embodiment of the present invention. Referring to FIG. 9, the user mobile terminal 10 includes an image storage 90, a personal information storage 92, an operating unit 94, a controller 96, and a personal information acquirer 97. The user mobile terminal 10 may further include a communication unit 98.

A plurality of images is stored in the image storage 90 and personal information for persons included in the plurality of stored images is stored in the personal information storage 92. A person of interest to the user mobile terminal 10 user is selected from the plurality of images stored in the image storage 90 and input to the operating unit 94.

The controller 96 retrieves personal information for the person of interest selected through the operating unit 94 from the personal information storage 92. If the personal information for the selected person of interest is not retrieved or available, the controller 96 selects a relay person from the plurality of images stored in the image storage 90 to which the person of interest is relayed.

The controller 96 may include a facial recognition unit 960, a personal information retrieval unit 962, and a relay person selector 964. The facial recognition unit 960 recognizes the selected person of interest and the relay person through facial recognition. The personal information retrieval unit 962 retrieves personal information for a person having a facial area matching a facial area of the recognized person of interest using face pattern matching from the personal information storage 92. If the personal information for the selected person of interest is not retrieved or available, the relay person selector 964 selects the relay person from the plurality of images.

The relay person selector 964 may select an unselected person in the image including the selected person of interest as the relay person. Further, if the personal information for the selected relay person is not retrieved or available, the relay person selector 964 retrieves another image including the unselected person and newly selects a person other than the unselected person in the retrieved other image as the relay person.

The relay person selector 964 may select the relay person using at least one of group information obtained by grouping members through a social network, photograph information, including an image photographing place, a photographing purpose, or an image photographing time, and schedule information.

Meanwhile, the personal information acquirer 97 acquires the personal information for the person of interest from the relay-person mobile terminal 12 associated with or corresponding to the relay person selected by the controller 96 or from the person-of-interest mobile terminal 14. The communication unit 98 communicates with the person-of-interest mobile terminal 14 associated with or corresponding to the person of interest and the relay-person mobile terminal 12 using the personal information acquired by the personal information acquirer 97.

The personal information acquirer 97 may request the relay-person mobile terminal 12 to provide the personal information for the person of interest using communication information of the selected relay person, and may receive the personal information for the person of interest. Then, the communication unit 98 communicates with the person-of-interest mobile terminal 14 using the received personal information. In this case, the communication unit 98 may request the person-of-interest mobile terminal 14 to accept communication with the user mobile terminal 10 through relay of the relay-person mobile terminal 12. If the request is accepted, the communication unit 98 may communicate with the person-of-interest mobile terminal 14.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for forming a human network using a mobile terminal, the method comprising:
   selecting a person of interest from a first image of stored images;
   selecting a relay person from the first image to which information about the selected person of interest is relayed; and
   acquiring the personal information for the selected person of interest from a mobile terminal of the selected relay person,
   wherein the selecting of the relay person comprises selecting an unselected person in the first image as the relay person, and
   wherein the selecting of the relay person further comprises retrieving a second image including an unselected person, and selecting a person other than the unselected person in the retrieved second image as the relay person.

2. The method of claim 1, wherein the selecting of the person of interest comprises:
   detecting facial areas of persons included in the first image;
   recognizing a facial area of the selected person of interest from the detected facial areas; and
   selecting a person having the recognized facial area as the person of interest.

3. The method of claim 1, wherein the person of interest is selected through a touch sensor or a pointing input unit.

4. The method of claim 1, wherein the personal information for the selected person of interest or the selected relay person is provided by recognizing the person of interest or the relay person through facial recognition and retrieving personal information for a person having a facial area matching a facial area of the recognized person of interest or the recognized relay person using face pattern matching.

5. The method of claim 1, wherein the selecting of the relay person further comprises retrieving a third image including an unselected person corresponding to the unselected person in the first image, and selecting a person other than the unselected person in the retrieved third image as an additional relay person.

6. The method of claim 1, wherein the selecting of the relay person comprises:
   retrieving the second image having photograph information similar to photograph information for the first image, the photograph information being an image photographing place, an image photographing purpose, or an image photographing time, or combinations thereof; and
   selecting a person included in the second image as the relay person.

7. The method of claim 1, wherein the selecting of the relay person comprises selecting a person included in a same group as the selected person of interest in the first image as the relay person using group information of members of the same group.

8. The method of claim 1, wherein the selecting of the relay person comprises retrieving a person having schedule information corresponding to photograph information for an image including the selected person of interest, and selecting the retrieved person as the relay person .

9. The method of claim 1, wherein the selecting of the relay person comprises selecting the relay person according to at least one priority, the priority including a friendliness level with the selected person of interest, a physical distance from the selected person of interest, and a contactability level with the selected person of interest.

10. The method of claim 1, wherein the acquiring of the personal information for the selected person of interest from the mobile terminal of the selected relay person comprises requesting the mobile terminal of the selected relay person to provide the personal information for the selected person of interest using communication information of the selected relay person, and receiving the personal information of the selected person of interest.

11. The method of claim 1, further comprising communicating with a mobile terminal of the selected person of interest using the acquired personal information for the person of interest.

12. The method of claim 11, wherein the communication information includes information about at least one of a call service, a short message service (SMS), a multimedia messaging service (MMS), an E-mail, and a social network service (SNS).

13. The method of claim 11, wherein the communicating with the mobile terminal of the selected person of interest comprises requesting the mobile terminal of the selected person of interest to accept communication with the mobile terminal through relay of a mobile terminal of the selected relay person, and communicating with the mobile terminal of the selected person of interest if the request is accepted.

14. The method of claim 11, wherein, if the selected person of interest and a user requesting the personal information for the selected person of interest are included in a same group on the mobile terminal of the selected relay person, the mobile terminal of the selected relay person provides the personal information of the selected person of interest to the mobile terminal.

15. A mobile terminal, comprising:
   an image storage to store images;
   a personal information storage to store personal information for persons included in the stored images;
   an operating unit to select a person of interest from the stored images;
   a controller to select a relay person from a first image of the stored images to which information about the selected person of interest is relayed;
   a personal information acquirer to acquire the personal information for the selected person of interest from a mobile terminal of the selected relay person; and
   a relay person selector to select the relay person from the images,
   wherein the personal information acquirer requests the mobile terminal of the selected relay person to provide the personal information for the selected person of interest using communication information of the selected relay person,
   wherein the relay person selector selects an unselected person in the first image as the relay person, and
   wherein the relay person selector retrieves a second image including the unselected person and selects a person other than the unselected person in the retrieved second image as the relay person.

16. The mobile terminal of claim 15, wherein the controller comprises:
   a facial recognition unit to recognize the selected person of interest through facial recognition; and
   a personal information retrieval unit to retrieve personal information for a person having a facial area matching a facial area of the recognized person of interest using face pattern matching from the personal information storage.

17. The mobile terminal of claim 15, wherein the relay person selector selects the relay person using at least one of group information of members, photograph information including a photographing place, a photographing purpose, and a photographing time, and schedule information.

18. The mobile terminal of claim 15, further comprising a communication unit to communicate with a mobile terminal of the selected person of interest using the acquired personal information for the person of interest.

19. The mobile terminal of claim 18, wherein the communication unit requests a mobile terminal of the selected person of interest to accept communication with the mobile terminal through relay of a mobile terminal of the selected relay person.

20. A method for forming a human network using a mobile terminal, the method comprising:
   selecting a person of interest from a first image;
   identifying personal information for the selected person of interest using facial recognition; and retrieving the personal information for the selected person of interest from a relay person, wherein selecting the person of interest comprises:

detecting facial areas of persons included in the first image, recognizing a facial area of the selected person of interest from the detected facial areas, and selecting a person having the recognized facial area as the person of interest, and wherein the selecting of the relay person conmprises:

retrieving a second image including an unselected person corresponding to an unselected person in the first image, and selecting a person in the retrieved second image other than the unselected person in the retrieved second image as the relay person.

21. The method of claim 1, wherein the acquiring comprises requesting the personal information for the selected person of interest from the mobile terminal of the selected relay person using communication information of the selected relay person.

22. The method of claim 20, wherein the retrieving comprises requesting the personal information for the selected person of interest from the mobile terminal of the selected relay person using communication information of the selected relay person.

23. The method of claim 20, further comprising communicating with a mobile terminal of the selected person of interest using the acquired personal information for the person of interest.

\* \* \* \* \*